US012633452B2

(12) United States Patent
Takahashi et al.

(10) Patent No.: US 12,633,452 B2
(45) Date of Patent: May 19, 2026

(54) METHOD AND DEVICE FOR PRODUCING WOUND CORE

(71) Applicant: NIPPON STEEL CORPORATION, Tokyo (JP)

(72) Inventors: Masaru Takahashi, Tokyo (JP); Takahito Mizumura, Tokyo (JP)

(73) Assignee: NIPPON STEEL CORPORATION, Tokyo (JP)

(*) Notice: Subject to any disclaimer, the term of this patent is extended or adjusted under 35 U.S.C. 154(b) by 674 days.

(21) Appl. No.: 18/031,580

(22) PCT Filed: Oct. 26, 2021

(86) PCT No.: PCT/JP2021/039561
§ 371 (c)(1),
(2) Date: Apr. 12, 2023

(87) PCT Pub. No.: WO2022/092121
PCT Pub. Date: May 5, 2022

(65) Prior Publication Data
US 2023/0386740 A1 Nov. 30, 2023

(30) Foreign Application Priority Data
Oct. 26, 2020 (JP) ................................ 2020-178569

(51) Int. Cl.
*H01F 41/02* (2006.01)
*H01F 1/16* (2006.01)
*H01F 27/245* (2006.01)

(52) U.S. Cl.
CPC ............ *H01F 41/024* (2013.01); *H01F 1/16* (2013.01); *H01F 27/2455* (2013.01)

(58) Field of Classification Search
CPC .......... H01F 41/024; H01F 1/147; H01F 1/16; H01F 27/2455; H01F 27/08; H01F 27/25; Y10T 29/49009; Y10T 29/49073
See application file for complete search history.

(56) References Cited

U.S. PATENT DOCUMENTS 4,789,849 A * 12/1988 Ballard .................. H01F 27/25 336/219
6,473,961 B1 * 11/2002 Segal ..................... H01F 27/25 29/609
(Continued)

FOREIGN PATENT DOCUMENTS

EP 3 101 667 A1 12/2016
EP 3 570 305 A1 11/2019
(Continued)

*Primary Examiner* — Donghai D Nguyen
(74) *Attorney, Agent, or Firm* — Birch, Stewart, Kolasch & Birch, LLP

(57) ABSTRACT

In this method of producing a wound core, at least one bent portion (5) of one or more laminated grain oriented electrical steel sheets (1) is formed such that one side (**1*b*) of the steel sheet (1) is placed and constrained on a die (30) and a punch (40) is press formed against a portion (1*a*) of the steel sheet (1) to be bent on the other free end side in the thickness (T) direction of the steel sheet. Outer surfaces of the die and the punch each have an arc portion (30*a*, 40*a*) having a predetermined curvature, and when the thickness of the steel sheet (1) is T, bent angles of the bent portions (5) are θ(°), a radius of curvature of the arc portion (30*a*) of the die is Rd, and a radius of curvature of the arc portion (40*a***) of the punch is Rp, relationships of Equations (1) to (5) below are satisfied.
(Continued)

$$0.02 \leq T/(2Rd+T) \leq 0.15 \quad (1)$$

$$0.5 \leq Rd \leq 3.0 \quad (2)$$

$$0.15 \leq T \leq 0.30 \quad (3)$$

$$2.5 \leq Rp/Rd \leq 10 \quad (4)$$

$$10° \leq \theta \leq 90° \quad (5)$$

8 Claims, 5 Drawing Sheets

(56) References Cited

U.S. PATENT DOCUMENTS

| | | | | |
|---|---|---|---|---|
| 10,886,055 | B2 * | 1/2021 | Mizumura | H01F 1/147 |
| 11,742,140 | B2 * | 8/2023 | Mizumura | H01F 27/245<br>29/602.1 |
| 11,869,697 | B2 * | 1/2024 | Mizumura | H01F 27/08 |

FOREIGN PATENT DOCUMENTS

| | | | |
|---|---|---|---|
| JP | 2005-286169 | A | 10/2005 |
| JP | 6224468 | B2 | 11/2017 |
| JP | 2018-148036 | A | 9/2018 |

* cited by examiner

METHOD AND DEVICE FOR PRODUCING WOUND CORE

TECHNICAL FIELD

The present invention relates to a method and a device for producing a wound core. Priority is claimed on Japanese Patent Application No. 2020-178569, filed Oct. 26, 2020, the content of which is incorporated herein by reference.

BACKGROUND ART

Transformer cores include a laminated core and a wound core. Among them, the wound core is generally produced by stacking grain-oriented electrical steel sheets in layers, winding them in a donut shape (winding shape), and then pressurizing the wound body to form it into a substantially square shape (in this specification, a wound core produced in this manner is sometimes referred to as a so-called Tranco Core which is one form of a representative wound core (subjected to strain relief annealing) (hereinafter called a Tranco Core)). Mechanical processing strain (plastic deformation strain) is generated in the entire grain-oriented electrical steel sheets through this forming process and cause significant deterioration in iron loss of the grain-oriented electrical steel sheets, and therefore it is necessary for strain relief annealing to be performed.

On the other hand, as other methods of producing a wound core, techniques such as those in Patent Documents 1 to 3 have been disclosed in which steel sheet portions that will be corner portions of a wound core are bent in advance so that a relatively small bending area with a radius of curvature of 3 mm or less is formed, and the bent steel sheets are laminated to form a wound core (in this specification, a wound core produced in this manner is sometimes referred to as UNICORE (registered trademark)). According to these production methods, a conventional large-scale press forming process is not required, the steel sheets are precisely bent to maintain the shape of a core, and processing strain is also concentrated at only the bent portions (corner portions). Therefore, it is also possible to omit the removal of strain through the above annealing process, industrial advantages are great, and application thereof is progressing.

CITATION LIST

Patent Documents

Patent Document 1
Japanese Unexamined Patent Application, First Publication No. 2005-286169
Patent Document 2
Japanese Patent No. 6224468
Patent Document 3
Japanese Unexamined Patent Application, First Publication No. 2018-148036

SUMMARY OF THE INVENTION

Problems to be Solved by the Invention

Incidentally, when bending and forming a portion of a steel sheet to form a corner portion of UNICORE, specifically, when grain-oriented electrical steel sheets or strips obtained by slitting the grain-oriented electrical steel sheets parallel to the rolling direction of the steel sheet are bent at a plurality of folds (bent portions) along the direction perpendicular to the rolling direction of the steel sheet to form a polygonal core, if the bending conditions are strict, cracks may form in the bent portions. In addition, even if no cracks form, there is a concern that an insulating coating on the surface of the grain-oriented electrical steel sheets will peel off or be powdered and accumulate between the laminated steel sheets, or that a die (punch) will scratch the surface of the steel sheets due to repetition of bending with the same die. On the other hand, if the bending conditions are eased, spring-back will occur in the bent portions and the shape fixability will become insufficient. Accordingly, when a core is prepared, a large gap may be generated between laminated steel sheets or the core may have a shape insufficient for assembling as a core.

In either event, the problem is that the effective volume ratio of the core becomes small, and secondary problems arise in terms of quality such as the shape of the core or scratches on the surface.

The present invention has been made in consideration of the above circumstances, and an object of the invention is to provide a method and a device for producing a wound core which can minimize cracking in bent portions of grain-oriented electrical steel sheets during bending of the steel sheets, prevent scratches on the surface of the steel sheets or peeling-off or powdering of a coating on the surface, and improve the shape fixability.

MEANS FOR SOLVING THE PROBLEM

In order to achieve the object, the present invention provides a method of producing a wound core that is a wound core having a wound shape including a rectangular hollow portion in the center and a portion in which grain-oriented electrical steel sheets in which planar portions and bent portions are alternately continuous in a longitudinal direction are stacked in a sheet thickness direction, which is a wound core formed by stacking the grain-oriented electrical steel sheets that have been individually bent in layers and assembled into a wound shape and in which the plurality of grain-oriented electrical steel sheets are connected to each other via at least one joining part for each roll, the method including: forming at least one of the bent portions of one or more of the laminated grain-oriented electrical steel sheets such that one side of the grain-oriented electrical steel sheet is placed and constrained on a die and a punch is press formed against a portion of the grain-oriented electrical steel sheet to be bent on the other free end side in the thickness direction of the grain-oriented electrical steel sheet, outer surfaces of the die and the punch each have an arc portion having a predetermined curvature on a cross section along the thickness direction of the grain-oriented electrical steel sheet, when the thickness of the grain-oriented electrical steel sheet is T (mm), bent angles of the bent portions are θ(°), a radius of curvature of the arc portion of the die is Rd (mm), and a radius of curvature of the arc portion of the punch is Rp (mm), relationships of Equations (1) to (5) below are satisfied, and the portion of the grain-oriented electrical steel sheet to be bent is pressurized by the arc portion of the punch and bent along the arc portion of the die so that four or more of the bent portions are formed in one of the grain-oriented electrical steel sheets.

$$0.02 \leq T/(2Rd+T) \leq 0.15 \quad (1)$$

$$0.5 \leq Rd \leq 3.0 \quad (2)$$

-continued $$0.15 \le T \le 0.30 \quad (3)$$

$$2.5 \le Rp/Rd \le 10 \quad (4)$$

$$10° \le \theta \le 90° \quad (5)$$

In terms of practical situations in which, when bending and forming a portion of a steel sheet to form a corner portion in a wound core in the form of UNICORE, if the bending conditions are strict, there is a concern that cracks will form in the bent portions, coatings on the surfaces of steel sheets will peel off or be powdered and accumulate between the laminated steel sheets, or a die will scratch the surface of the steel sheets, on the other hand, if the bending conditions are eased, spring-back will occur in the bent portions and the shape fixability will become insufficient, the present inventors have focused on the facts that the shape fixability can be improved by applying sufficient plastic strain in the tensile direction on the outer side of bending of the bent portions of the steel sheets, on the other hand, formation of cracking of the bent portions of the steel sheets can be minimized by reducing the plastic strain on the outer side of bending of the bent portions of the steel sheets to a certain value or less, and significant peeling-off and powdering of an insulating coating can be minimized by reducing compression strain on the inner side of bending of the bent portions of the steel sheets. The present inventors have found that the above series of problems can be solved by performing bending controlled so as to apply appropriate plastic strain within a certain range according to the thickness of a grain-oriented electrical steel sheet to be bent, specifically, by setting at least the ratio Rp/Rd of the radius of curvature Rp of an arc portion of a punch to the radius of curvature Rd of an arc portion of a die when pressurizing a portion of a grain-oriented electrical steel sheet to be bent using the arc portion of the punch to bend it along the arc portion of the die through a one-side free bending method of pressurizing and bending a free end portion on one side of the grain-oriented electrical steel sheet of which the other side is placed on the die using the punch, to be within a certain range. In addition, it has also been found that, in this case, if Rp/Rd is too small, the processing force becomes too large, and although sufficient plastic strain can be applied, the friction between the punch and the surface of the steel sheet increases and the surface of the steel sheet is likely to be scratched. On the other hand, it has also been found that, when Rp/Rd exceeds a certain range, the processing force becomes small, making it difficult to apply sufficient plastic strain.

More specifically, in such a one-side free bending method, at least one of the bent portions of one or more laminated grain-oriented electrical steel sheets is formed such that one side of a grain-oriented electrical steel sheet is placed and constrained on a die and a punch is pressed against a portion of the grain-oriented electrical steel sheet to be bent on the other free end side in the thickness direction of the grain-oriented electrical steel sheet. In this case, outer surfaces of the die and the punch each have an arc portion having a predetermined curvature on a cross section along the thickness direction of the grain-oriented electrical steel sheet, and when the thickness of the grain-oriented electrical steel sheet is T (mm), bent angles of the bent portions are θ(°), the radius of curvature of the arc portion of the die is Rd (mm), and a radius of curvature of the arc portion of the punch is Rp (mm), relationships of Equations (1) to (5) below are satisfied.

$$0.02 \le T/(2Rd + T) \le 0.15 \quad (1)$$

$$(T/(2Rd + T) \text{ is applied strain calculated})$$

$$0.5 \le Rd \le 3.0 \quad (2)$$

$$0.15 \le T \le 0.30 \quad (3)$$

$$2.5 \le Rp/Rd \le 10 \quad (4)$$

$$10° \le \theta \le 90° \quad (5)$$

Accordingly, the shape of the laminated steel sheets can be made uniform in the width direction and the shape of the bent portions of the steel sheets can be made uniform throughout the ridge direction, thereby achieving excellent shape quality and improving the effective volume ratio of the core. In addition, the strain introduced into the bent portions of the steel sheets can be reduced to reduce iron loss of the core. Accordingly, it is possible to minimize cracking in bent portions of grain-oriented electrical steel sheets during bending of the steel sheets, prevent scratches on the surface of the steel sheets or peeling-off or powdering of a coating on the surface, and improve the shape fixability.

In the present disclosure, a bent angle of a bent portion means an angle difference between a front straight portion and a rear straight portion in the bending direction in the bent portion of a grain-oriented electrical steel sheet and is, as shown in FIG. 6, expressed as an angle φ of a supplementary angle of an angle formed by two virtual lines Lb-elongation1 and Lb-elongation2 obtained by extending straight portions that are surfaces of planar portions 4, 4*a* on both sides sandwiching the bent portion 5 on the outer surface of the grain-oriented electrical steel sheet.

In the present disclosure, the grain-oriented electrical steel sheet also includes strips or steel strips obtained by slitting the steel sheet parallel to its rolling direction. In addition, formation of four or more bent portions for one grain-oriented electrical steel sheet (or one piece of steel strip) in a case where the bent angles θ(°) of the bent portions satisfy the relationship of 10°≤θ≤90° has an advantage of being able to form a rectangular parallelepiped wound core that is industrially easy to handle. In addition, in the above configuration, the bent portions are preferably formed by bending the portions of the grain-oriented electrical steel sheet to be bent at a punch speed of 30 mm/min to 3,000 mm/min. Accordingly, there are disadvantages that the productivity is poor and the shape fixability is less likely to be obtained at a punch speed lower than 30 mm/min, the punch does not fit well when it comes into contact with the steel sheet and the bending shape is likely to vary at a punch speed higher than 3,000 mm/min. That is, if the punch speed is within the range of 30 mm/min to 3,000 mm/min, there are advantages that the productivity is favorable, a shape is easy to make, and the shape fixability is preferably ensured. In addition, in the above configuration, it is preferable that a predetermined clearance C (mm) be provided between the die and the punch on the cross section along the thickness direction of the grain-oriented electrical steel sheet in a direction orthogonal to a press forming direction of the punch and that the clearance be within a range of 0.5 T≤C≤1.5 T in the case where the thickness of the grain-oriented electrical steel sheet used is T (mm). Accordingly, in the case where the clearance is less than 0.5 T, although the shape fixability of the bending unit is likely to be obtained due to an increased contact surface pressure between the punch and the steel sheet, the surface of the steel sheet is likely to be scratched due to frictional force between the punch and the grain-oriented electrical steel sheet due to the increased contact surface pressure. If the clearance exceeds 1.5 T, the contact surface pressure between the punch and the steel sheet decreases, so that the shape fixability of the bending unit is less likely to be obtained and the shape of the core deteriorates. That is, when the clearance is within the range of 0.5 T≤C≤1.5 T, there is an advantage that the shape fixability of the core and the quality (such as scratches) of the surface of the core can be ensured in a well-balanced manner.

In addition, the present invention also provides a device for producing a wound core in the form of UNICORE. Specifically, such a production device includes a bending unit that individually bends grain-oriented electrical steel sheets; and an assembly unit that stacks the bent grain-oriented electrical steel sheets in layers and assembles them into a wound shape to form a wound-shaped wound core including a portion in which grain-oriented electrical steel sheets in which planar portions and bent portions are alternately continuous in a longitudinal direction are stacked in a sheet thickness direction, in which the bending unit has a die and a punch, and in the bending unit, an arc portion having a predetermined curvature on a cross section along the thickness direction of the grain-oriented electrical steel sheets is formed on outer surfaces of the die and the punch, and at least one of the bent portions of one or more of the laminated grain-oriented electrical steel sheets is formed such that one side of the grain-oriented electrical steel sheet is placed and constrained on the die and a portion of the grain-oriented electrical steel sheet to be bent on the other free end side is pressurized by the arc portion of the punch in the thickness direction of the grain-oriented electrical steel sheet and bent along the arc portion of the die, and when the thickness of the grain-oriented electrical steel sheet is T (mm), bent angles of the bent portions are θ(°), a radius of curvature of the arc portion of the die is Rd (mm), and a radius of curvature of the arc portion of the punch is Rp (mm), relationships of Equations (1) to (5) below are satisfied.

$$0.02 \leq T/(2Rd+T) \leq 0.15 \quad (1)$$

$$0.5 \leq Rd \leq 3.0 \quad (2)$$

$$0.15 \leq T \leq 0.30 \quad (3)$$

$$2.5 \leq Rp/Rd \leq 10 \quad (4)$$

$$10^\circ \leq \theta \leq 90^\circ \quad (5)$$

According to the device for producing a wound core having the above configuration, the shape of the laminated steel sheets can be made uniform in the width direction and the shape of the bent portions of the steel sheets can be made uniform throughout the ridge direction, thereby achieving excellent shape quality and improving the effective volume ratio of the core. In addition, the strain introduced into the bent portions of the steel sheets can be reduced to reduce iron loss of the core. Accordingly, it is possible to minimize cracking in bent portions of grain-oriented electrical steel sheets during bending of the steel sheets, prevent scratches on the surface of the steel sheets or peeling-off or powdering of a coating on the surface, and improve the shape fixability.

Effects of the Invention

According to the present invention, it is possible to provide a method and a device for producing a wound core which can minimize cracking in bent portions of grain-oriented electrical steel sheets during bending of the steel sheets, prevent scratches on the surface of the steel sheets or peeling-off or powdering of a coating on the surface, and improve the shape fixability.

EMBODIMENTS FOR IMPLEMENTING THE INVENTION

Hereinafter, a wound core according to one embodiment of the present invention will be sequentially described in detail. However, the present invention is not limited to the configuration disclosed in the present embodiment, and various modifications can be made within the scope not departing from the gist of the present invention. A lower limit value and an upper limit value are included in a numerical limit range described below. A numerical value represented by "more than" or "less than" is not included in the numerical range. In addition, "%" relating to chemical composition means "mass %" unless otherwise specified.

In addition, for example, terms such as "parallel," "perpendicular," "identical," and "right angle" and length and angle values used in this specification to specify shapes, geometric conditions and their extents are not bound by strict meanings, and should be interpreted to include the extent to which similar functions can be expected.

In addition, "grain-oriented electrical steel sheet" in this specification is sometimes simply described as "steel sheet" or "electrical steel sheet," and "wound core" is sometimes simply described as "core".

The wound core according to the present embodiment is a wound core including a substantially rectangular wound core main body in a side view, in which the wound core main body has a substantially rectangular laminated structure in a side view and includes a portion in which grain-oriented electrical steel sheets, in which planar portions and bent portions are alternately continuous in a longitudinal direction, are stacked in a sheet thickness direction. An inner side radius of curvature r in a side view of each of the bent portions is 1.0 mm to 5.0 mm The grain-oriented electrical steel sheets have, for example, a chemical composition containing, in mass %, Si: 2.0% to 7.0%, with the remainder being Fe and impurities, and have a texture oriented in the Goss orientation.

Next, the shapes of grain-oriented electrical steel sheets and a wound core according to one embodiment of the present invention will be specifically described. The shapes of the wound core and the grain-oriented electrical steel sheets to be described here are not particularly new, and merely correspond to the shapes of well-known wound cores and grain-oriented electrical steel sheets.

Figure 1:
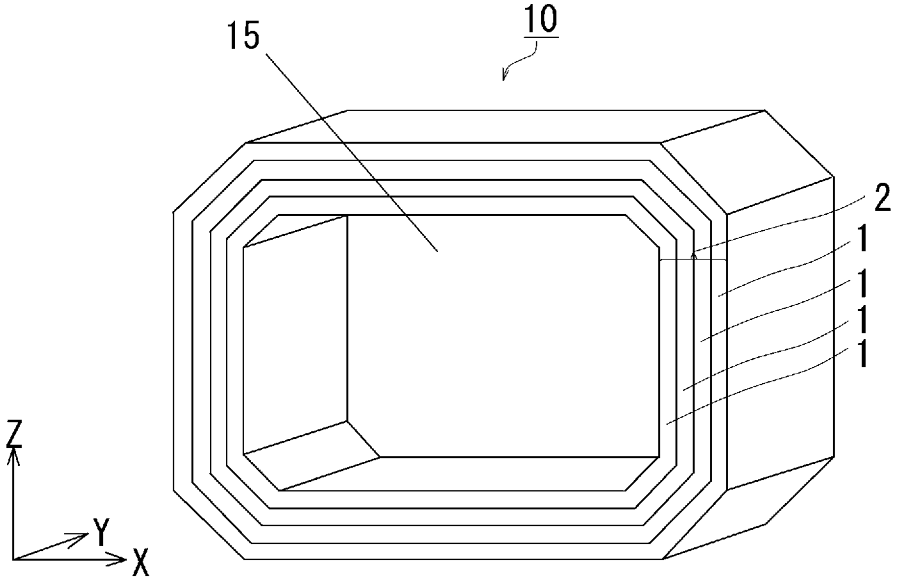
FIG. 1 is a perspective view schematically showing a wound core according to one embodiment of the present invention.
Figure 2:
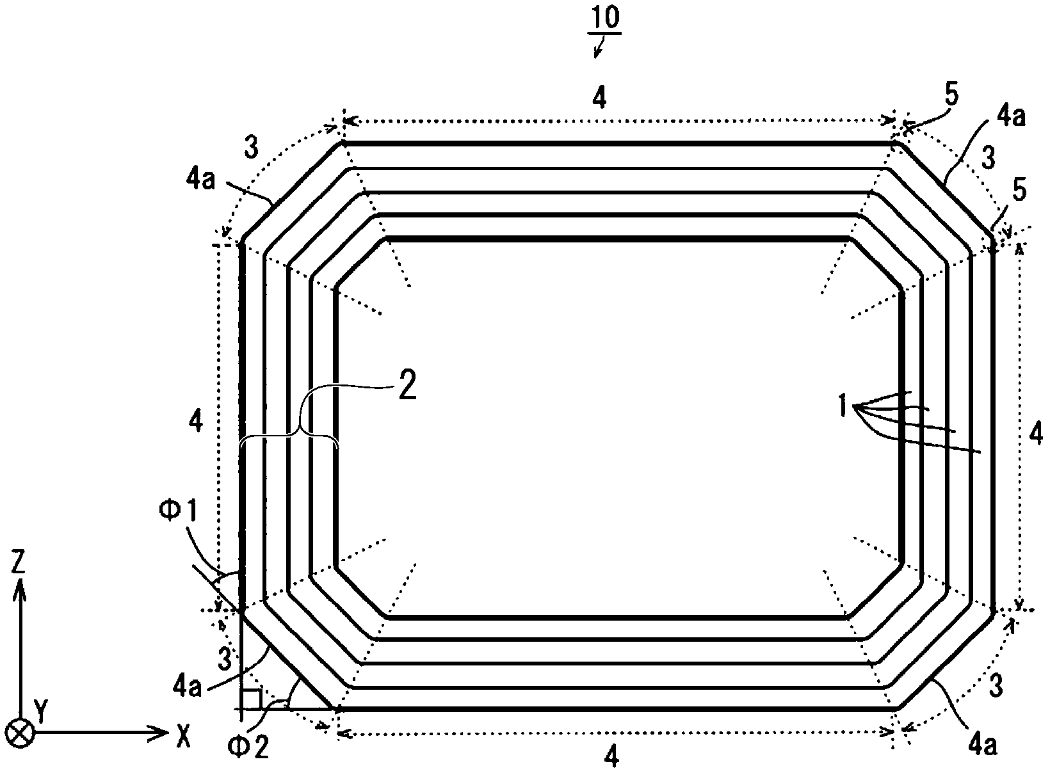
FIG. 2 is a side diagram of the wound core shown in the embodiment of FIG. 1.
Figure 3:
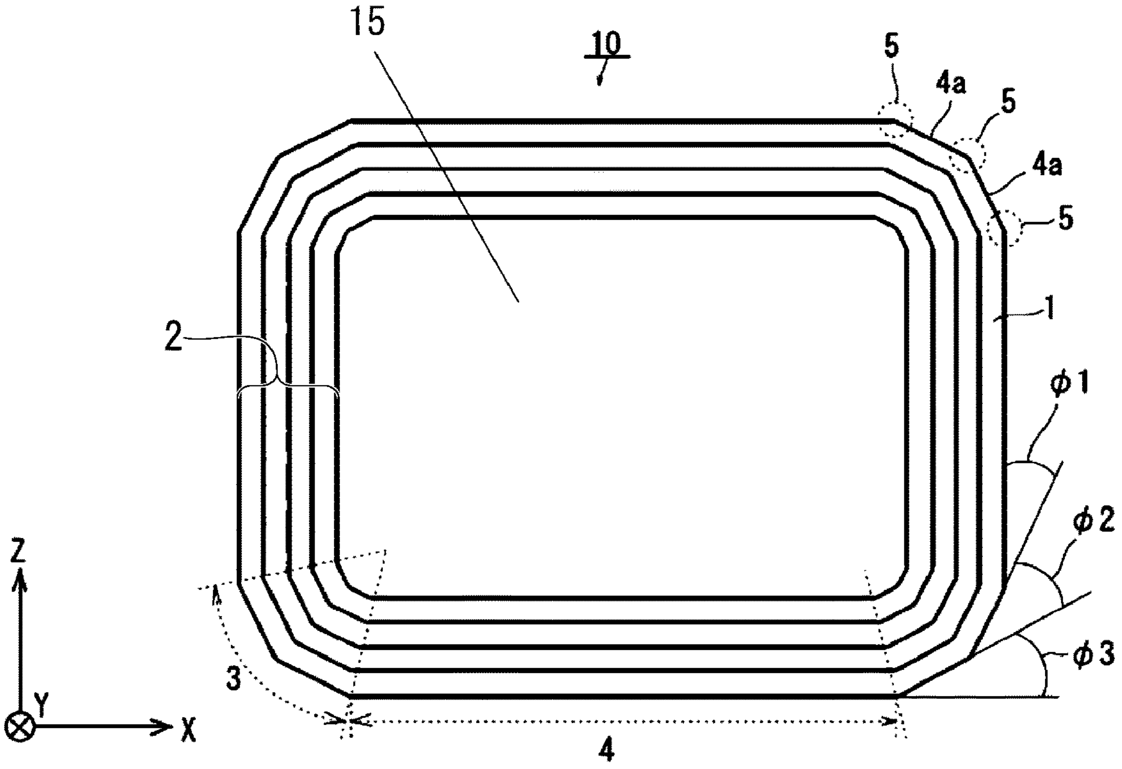
FIG. 3 is a side diagram schematically showing a wound core according to another embodiment of the present invention.

FIG. 1 is a perspective view schematically showing the present embodiment of the wound core. FIG. 2 is a side diagram of the wound core shown in the embodiment of FIG. 1. In addition, FIG. 3 is a side diagram schematically showing another embodiment of a wound core.

The side view in the present embodiment means viewing long-shaped grain-oriented electrical steel sheets 1 constituting a wound core in the width direction (Y-axis direction in FIG. 1). The side diagram is a diagram (diagram of FIG. 1 in the Y-axis direction) showing a shape visible in a side view.

The wound core according to the present embodiment includes: a substantially polygonal (rectangular) wound core main body 10 in a side view. The wound core main body 10 has a substantially rectangular laminated structure 2 in a side view in which grain-oriented electrical steel sheets 1 are stacked in a sheet thickness direction. The wound core main body 10 may be used as a wound core as it is or may have well-known fasteners such as a binding band as necessary to integrally fix a plurality of stacked grain-oriented electrical steel sheets 1.

In the present embodiment, the core length of the wound core main body 10 is not particularly limited. Even if the core length of the core changes, the volume of bent portions 5 is constant, so iron loss generated in the bent portions 5 is constant. The longer the core length, the smaller the volume fraction of the bent portions 5 with respect to the wound core main body 10, and therefore the smaller the influence on iron loss deterioration. Accordingly, the core length of the wound core main body 10 is preferably long. The core length of the wound core main body 10 is preferably 1.5 m or more and more preferably 1.7 m or more. In the present embodiment, the core length of the wound core main body 10 is a circumferential length of the wound core main body 10 at the central point in the laminating direction in a side view.

Such a wound core can be suitably used for any conventionally known applications.

The core according to the present embodiment has a substantially polygonal shape in a side view. In the following explanation using drawings, although a core with a substantially rectangular (quadrangular) shape which is a general shape will be described for simplicity of illustration and explanation, cores with various shapes can be produced depending on the lengths of planar portions 4 and the number or angles of bent portions 5. For example, if the angles of all the bent portions 5 are 45° and the planar portions 4 have the same length, the side view will be octagonal. In addition, if the angles are 60°, there are six bent portions 5, and the planar portions 4 have the same length, the side view will be hexagonal.

As shown in FIGS. 1 and 2, the wound core main body 10 has a substantially rectangular laminated structure 2 having a hollow portion 15 in a side view and includes a portion in which grain-oriented electrical steel sheets 1, in which planar portions 4, 4*a* and bent portions 5 are alternately continuous in a longitudinal direction, are stacked in a sheet thickness direction. A corner portion 3 including the bent portions 5 has two or more bent portions 5 having a curved shape in a side view, and the sum of bent angles of the bent portions 5 existing in one corner portion 3 is, for example, 90°. The corner portion 3 has a planar portion 4*a* shorter than a planar portion 4 between adjacent bent portions 5, 5. Accordingly, the corner portion 3 is formed to have two or more bent portions 5 and one or more planar portions 4*a*. In the embodiment of FIG. 2, the angle of one bent portion 5 is 45°. In the embodiment of FIG. 3, the angle of one bent portion is 30°.

As shown in these examples, the wound core of the present embodiment can be formed with bent portions with various angles, and a bent angle φ (φ1, φ2, and φ3) of a bent portion 5 is preferably 60° or less and more preferably 45° or less from the viewpoint of minimizing iron loss by minimizing generation of strain due to deformation during processing. The bent angles φ of bent portions of one core can be arbitrarily configured. For example, φ1 can be set to 60° and φ2 can be set to 30°. The folding angles (bent angles) are preferably the same as each other from the viewpoint of production efficiency. However, in a case where iron loss of a core to be produced can be reduced due to iron loss of steel sheets used by reducing the number of deformation sites beyond a certain level, bent portions with a combination of different angles may be processed. The design can be arbitrarily selected from points that are emphasized in core processing.

Figure 6:
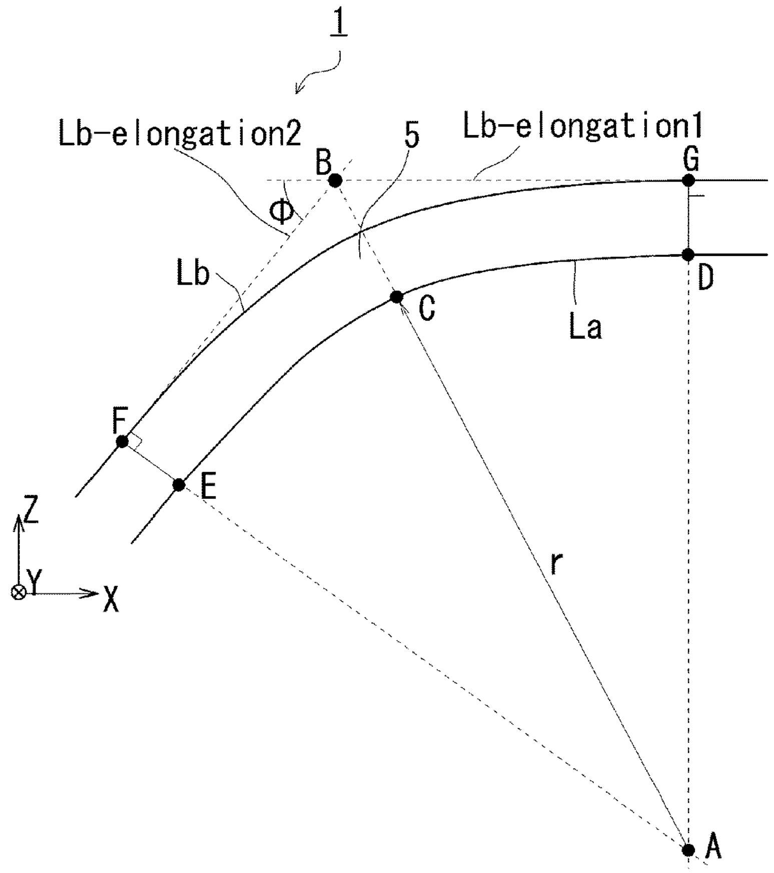
FIG. 6 is a side diagram schematically showing one example of a bent portion of a grain-oriented electrical steel sheet constituting a wound core of the present invention.

The bent portion 5 will be described in more detail with reference to FIG. 6. FIG. 6 is a diagram schematically showing one example of a bent portion (curved portion) 5 of a grain-oriented electrical steel sheet 1. The bent angle of the bent portion means an angle difference between a front straight portion and a rear straight portion in the bending direction in the bent portion 5 of the grain-oriented electrical steel sheet 1 and is expressed as an angle φ of a supplementary angle of an angle formed by two virtual lines Lb-elongation1 and Lb-elongation2 obtained by extending straight portions that are surfaces of planar portions 4, 4*a* on both sides sandwiching the bent portion 5 on the outer surface of the grain-oriented electrical steel sheet 1. At this time, a point where an extended straight line separates from the surface of the steel sheet is a boundary between a planar portion and a bent portion on the surface on the outer side of the steel sheet, and is a point F and a point G in FIG. 6.

Furthermore, straight lines perpendicular to the outer surface of the steel sheet respectively extend from the points F and G, and intersections with the inner surface of the steel sheet are respectively a point E and a point D. Each of the points E and D is a boundary between a planar portion 4 and a bent portion 5 on the inner surface of the steel sheet.

In the present embodiment, in a side view of the grain-oriented electrical steel sheet 1, the bent portion 5 is a portion of the grain-oriented electrical steel sheet 1 surrounded by the above points D, E, F, and G. In FIG. 6, the surface of the steel sheet between the points D and E, that is, the inner surface of the bent portion 5, is indicated by La, and the surface of the steel sheet between the points F and G, that is, the outer surface of the bent portion 5, is indicated by Lb.

In addition, the inner side radius of curvature r in a side view of the bent portion is shown in drawing. The radius of curvature r of the bent portion 5 is obtained by approximating the above La with the arc passing through the points E and D. The smaller the radius of curvature r, the sharper the curvature of the curved portion of the bent portion 5, and the larger the radius of curvature r, the gentler the curvature of the curved portion of the bent portion 5.

In the wound core of the present embodiment, the radius of curvature r at each bent portion 5 of each grain-oriented electrical steel sheet 1 laminated in the sheet thickness direction may vary to some extent. This variation may be due to forming accuracy, and unintended variation may occur due to handling or the like during lamination. Such an unintended error can be minimized to about 0.2 mm or less in current normal industrial production. In a case where such variations are large, a representative value can be obtained by measuring the radius of curvature r of a sufficiently large number of steel sheets and averaging them. In addition, it is thought that the radius of curvature could be intentionally changed for some reason, and the present embodiment does not exclude such a form.

The method of measuring the radius of curvature r of the bent portion 5 is not particularly limited, but the radius of curvature can be measured through observation with a commercially available microscope (Nikon ECLIPSE LV150) at a magnification of 200. Specifically, the curvature center point A is obtained from the observation results. As a method of obtaining this, for example, if the intersection of the line segment EF and the line segment DG extending inward on the side opposite to the point B is defined as A, the size of the radius of curvature r corresponds to the length of the line segment AC.

Figure 4:
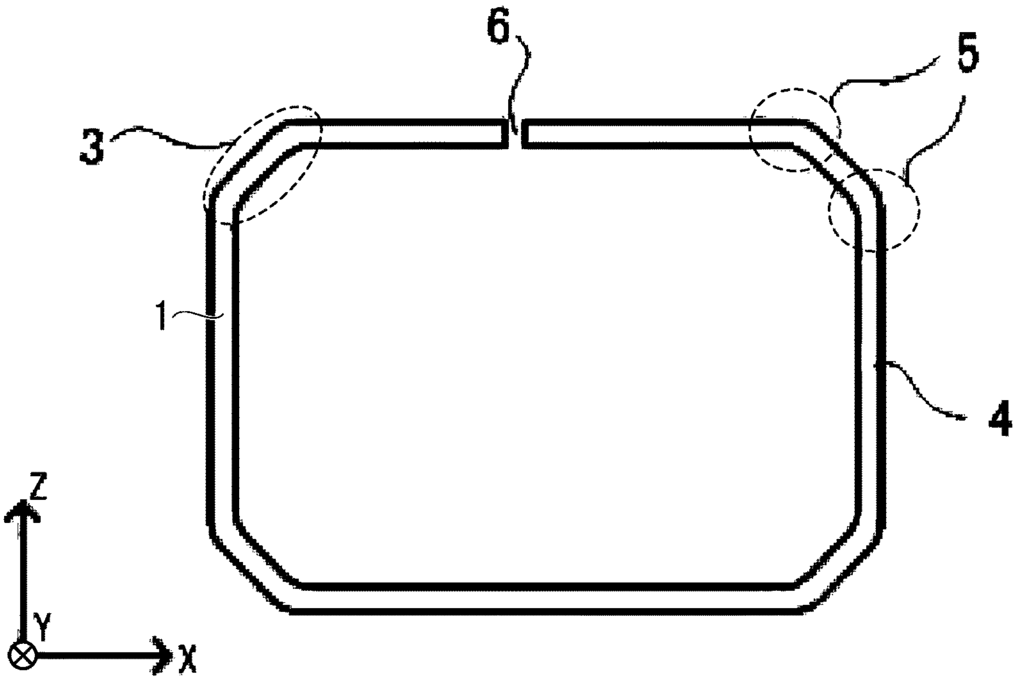
FIG. 4 is a side diagram schematically showing one example of a single-layer grain-oriented electrical steel sheet constituting a wound core.
Figure 5:
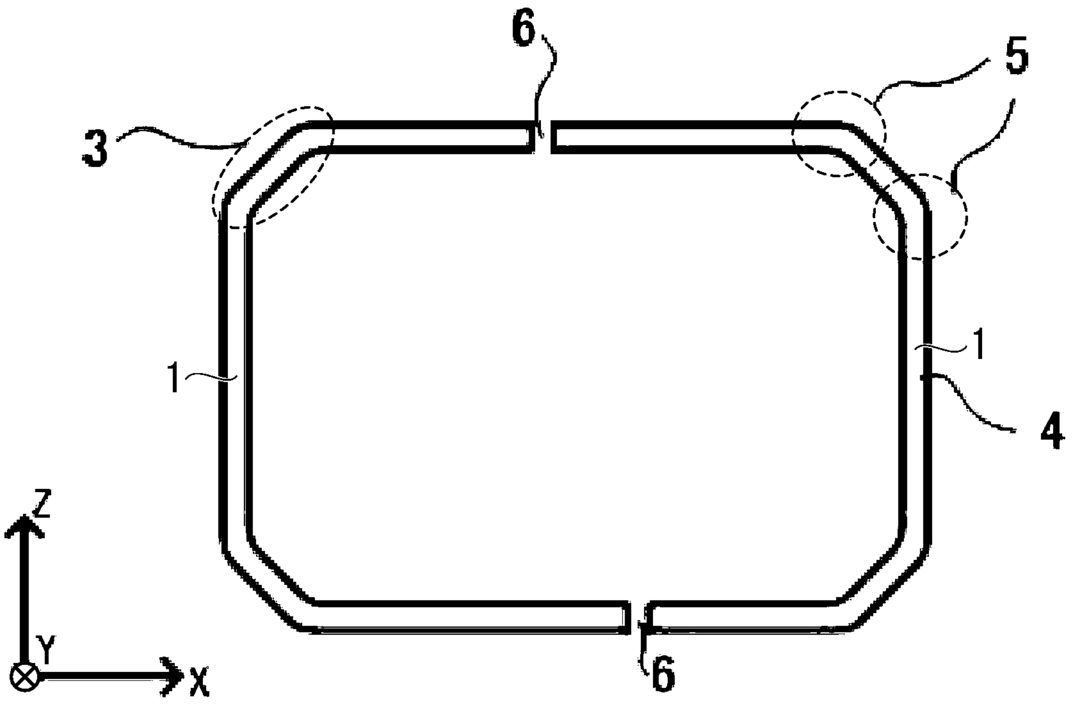
FIG. 5 is a side diagram schematically showing another example of a single-layer grain-oriented electrical steel sheet constituting a wound core.

FIGS. 4 and 5 are diagrams each schematically showing one example of a single-layer grain-oriented electrical steel sheet 1 in a wound core main body 10. The grain-oriented electrical steel sheet 1 used in the examples of FIGS. 4 and 5 is bent to realize a wound core in the form of UNICORE, has two or more bent portions 5 and planar portions 4, and forms a substantially polygonal ring in a side view via a joining part 6 (gap) which is an end surface of one or more grain-oriented electrical steel sheets 1 in the longitudinal direction.

In the present embodiment, it is sufficient as long as the wound core main body has a laminated structure 2 with a substantially polygonal shape as a whole in a side view. One grain-oriented electrical steel sheet 1 may form one layer of the wound core main body 10 via one joining part 6 as shown in the example of FIG. 4 (one grain-oriented electrical steel sheet 1 is connected via one joining part 6 for each winding). Alternatively, one grain-oriented electrical steel sheet 1 may form about half the circumference of a wound core and two grain-oriented electrical steel sheets 1 may form one layer of the wound core main body 10 via two joining parts 6 as shown in the example of FIG. 5 (two grain-oriented electrical steel sheets 1 are connected to each other via two joining parts 6 for each winding).

The thickness of the grain-oriented electrical steel sheet 1 used in the present embodiment is not particularly limited and may be appropriately selected depending on applications and the like, but is usually within a range of 0.15 mm to 0.30 mm and preferably within a range of 0.18 mm to 0.27 mm.

In addition, the method of producing the grain-oriented electrical steel sheet 1 is not particularly limited, and a conventionally known method of producing a grain-oriented electrical steel sheet can be appropriately selected. Preferred specific examples of the production method include a method in which a slab containing 0.04 to 0.1 mass % of C and having the chemical composition of the above grain-oriented electrical steel sheet 1 for the rest is heated to 1,000° C. or higher to perform hot rolling, and then hot-band annealing is performed as necessary, a cold-rolled steel sheet is subsequently obtained through cold rolling once or cold rolling twice or more including intermediate annealing, heated at 700° C. to 900° C. in, for example, a wet hydrogen-inert gas atmosphere, subjected to decarburization annealing, further subjected to nitridation annealing as necessary, and subjected to finish annealing at about 1,000° C. after an annealing separator is applied to the nitridation-annealed cold-rolled steel sheet to form an insulating coating at about 900° C. Furthermore, after that, coating or the like for adjusting the dynamic friction coefficient may be performed.

In addition, the effect of the present embodiment can be obtained even with a steel sheet subjected to processing generally called "magnetic domain control" using strain, grooves, or the like by a well-known method in the step of producing a steel sheet.

Figure 7:
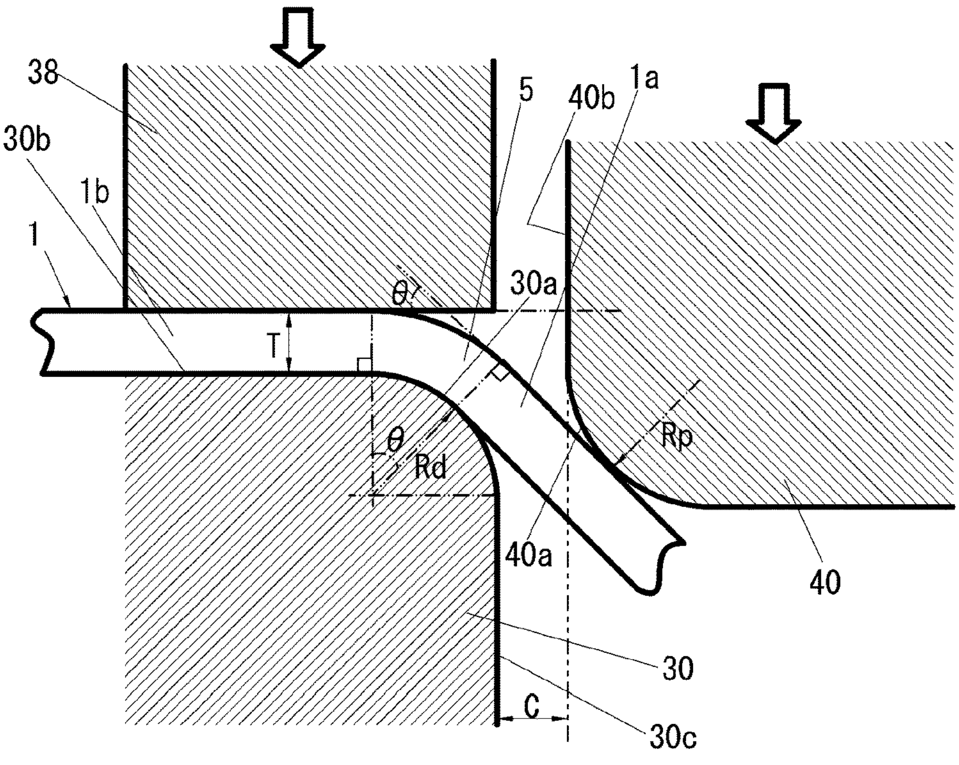
FIG. 7 is a cross-sectional view showing an aspect of forming a bent portion through a one-side free bending method of the present invention.

In addition, in the present embodiment, the wound core 10 composed of the grain-oriented electrical steel sheets 1 having the above form is formed by stacking individually bent the grain-oriented electrical steel sheets 1 in layers and assembling them into a wound shape, a plurality of the grain-oriented electrical steel sheets 1 are connected to each other via at least one joining part 6 (refer to FIGS. 4 and 5) for each winding, and at least one of the bent portions 5 of one or more of the laminated grain-oriented electrical steel sheets 1 is produced as follows. That is, as shown in FIG. 7, the bent portions 5 are formed through bending using a one-side free bending method. Specifically, as shown in the drawing, a punch 40 is pressed downward as indicated by the arrow against a one-side free end portion 1*a* which is a portion to be bent on a free end side of the grain-oriented electrical steel sheet 1 of which the other one side 1*b* is placed on a die 30 to pressurize and bend this one-side free end portion 1*a* in its thickness T direction. In this case, the one side 1*b* of the grain-oriented electrical steel sheet 1 placed on the die 30 is constrained in a fixed state by pressing a pressing member 38 downward against this one side 1*b* as indicated by the arrow. In addition, in the illustrated cross section along the thickness T direction of the grain-oriented electrical steel sheet 1 (cross section along both directions of the thickness T direction and the longitudinal direction of the grain-oriented electrical steel sheet 1), the die 30 has an arc portion 30*a* having a predetermined curvature in a clamping portion (outer surface of a corner portion) for sandwiching the grain-oriented electrical steel sheet 1 between itself and the punch 40. This arc portion 30*a* connects a linear placement portion 30*b* on which the grain-oriented electrical steel sheet 1 is placed and fixed with a linear orthogonal extension portion 30*c* extending substantially orthogonal to the placement portion 30*b*. Such a die 30 cooperates with the punch 40 which is pushed downward and has the same arc portion 40*a* in a clamping portion (outer surface) for sandwiching the grain-oriented electrical steel sheet 1 between itself and the die 30. Specifically, the one-side free end portion 1*a* of the grain-oriented electrical steel sheet 1 is pressurized by the arc portion 40*a* of the punch 40 and bent along the arc portion 30*a* of the die 30 to bend the one-side free end portion 1*a* of the grain-oriented electrical steel sheet 1 with a predetermined curvature. The bent angle of the bent portion 5 at this time is θ(°). The bent portion 5 is preferably formed by bending the one-side free end portion 1*a* of the grain-oriented electrical steel sheet 1 at a punch speed of 30 mm/min to 3,000 mm/min. Here, the punch speed is a relative moving rate of the punch 40 with respect to the die 30. The punch 40 moves linearly with respect to the die 30. In addition, it is preferable that four or more bent portions

5 formed through such bending be formed for one grain-oriented electrical steel sheet 1. At least one bent portion 5 of one or more grain-oriented electrical steel sheets 1 laminated may be formed.

Here, when the thickness of the grain-oriented electrical steel sheet 1 is T (mm), bent angles of the bent portions 5 are θ(°), the radius of curvature of the arc portion 30*a* of the die 30 is Rd (mm), and the radius of curvature of the arc portion 40*a* of the punch 40 is Rp (mm), relationships of Equations (1) to (5) below are satisfied.

$$0.02 \le T/(2Rd+T) \le 0.15 \quad (1)$$

$$(T/(2Rd+T) \text{ is applied strain calculated})$$

$$0.5 \le Rd \le 3.0 \quad (2)$$

$$0.15 \le T \le 0.30 \quad (3)$$

$$2.5 \le Rp/Rd \le 10 \quad (4)$$

$$10° \le \theta \le 90° \quad (5)$$

In addition, in the illustrated cross section along the thickness T direction of the grain-oriented electrical steel sheet 1, a predetermined clearance C is provided between the die 30 and the punch 40 in the direction orthogonal to the press forming direction (vertical direction in FIG. 7) of the punch 40. That is, the orthogonal extension portion 30*c* of the die 30 and a facing surface portion 40*b* of the punch 40 which face each other during pressurization using the punch 40 separate from each other with a predetermined clearance C (mm) in the direction orthogonal to the punch-pressing direction. In this case, the clearance C is set in a range of 0.5 T≤C≤1.5 T.

Figure 8:
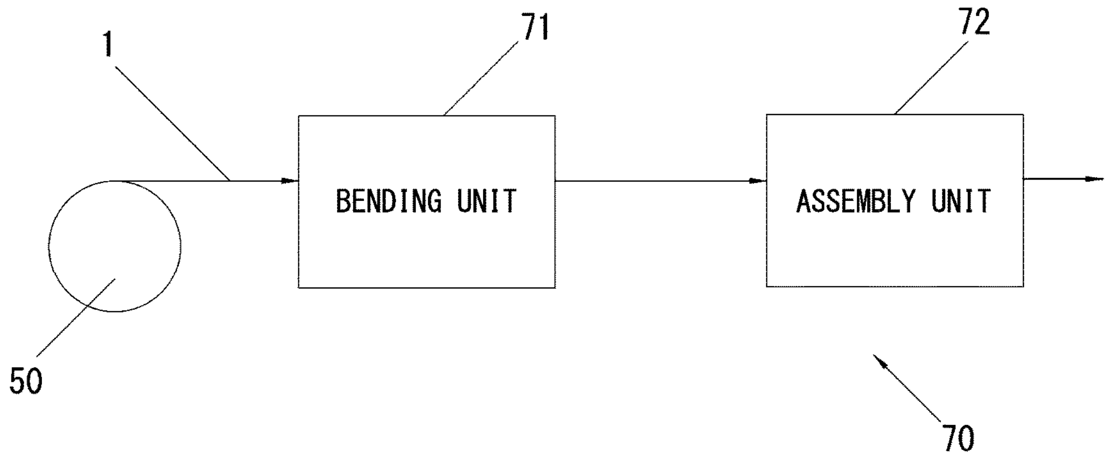
FIG. 8 is a block diagram schematically showing a configuration of a device for producing a wound core.

In addition, a block diagram of a device that enables production of a wound core with the one-side free bending method as described above is schematically shown in FIG. 8. FIG. 8 schematically shows a device 70 for producing a wound core in the form of UNICORE. This production device 70 includes a bending unit 71 that individually bends the grain-oriented electrical steel sheet 1 and may include an assembly unit 72 that stacks the bent grain-oriented electrical steel sheets 1 in layers and assembles them into a wound shape to form a wound-shaped wound core including a portion in which the grain-oriented electrical steel sheets 1, in which the planar portions 4, 4*a* and bent portions 5 are alternately continuous in the longitudinal direction, are stacked in the sheet thickness direction.

A grain-oriented electrical steel sheet 1 is dispensed from a steel sheet supply unit 50, which holds a hoop material formed by winding the grain-oriented electrical steel sheet 1 into a roll shape, at a predetermined conveying speed and supplied to the bending unit 71. The grain-oriented electrical steel sheet 1 supplied in this manner is cut into an appropriate size in the bending unit 71 and subjected to bending in which a small number of sheets, for example, one sheet at a time, are individually bent. In the grain-oriented electrical steel sheet 1 obtained in this manner, since the radius of curvature r of a bent portion 5 caused by the bending becomes significantly small, processing strain applied to the grain-oriented electrical steel sheet 1 due to the bending becomes significantly small. In this manner, an annealing step can be omitted if the volume affected by processing strain can be reduced while the density of the processing strain is expected to increase.

In addition, the bending unit 71 has the die 30 and the punch 40 as described above, and at least one bent portion 5 of one or more grain-oriented electrical steel sheets 1 laminated is formed such that one side 1*b* of a grain-oriented electrical steel sheet 1 is placed and constrained on the die 30 and a portion of the grain-oriented electrical steel sheet 1 to be bent on the other free end side (one-side free end portion 1*a*) is pressurized by the arc portion 40*a* of the punch 40 in the thickness T direction of the grain-oriented electrical steel sheet to bend the portion along the arc portion 30*a* of the die 30.

EXAMPLES

Hereinafter, the technical details of the present invention will be further described with reference to examples of the present invention. The conditions in the examples shown below are condition examples employed for confirming the feasibility and effect of the present invention, and the present invention is not limited to these condition examples. In addition, the present invention can adopt various conditions as long as the gist of the present invention is not deviated and the object of the present invention is achieved.

In these examples, grain-oriented electrical steel sheets (steel sheet Nos. 1 to 8) shown in Table 1 were used to prepare cores shown in Table 2, and the properties of the cores were measured. The detailed production conditions and properties are shown in Table 3.

Specifically, the magnetic properties and the chemical composition (mass %) of the grain-oriented electrical steel sheets are shown in Table 1. The magnetic properties of the grain-oriented electrical steel sheets were measured based on a single sheet magnetic property test method (Single Sheet Tester: SST) specified in JIS C 2556: 2015. As magnetic properties, the magnetic flux density B8 (T) in the rolling direction of a steel sheet when excitation was performed at 800 A/m and the iron loss (W17/50 (W/kg)) at an AC frequency of 50 Hz and an excitation magnetic flux density of 1.7 T were measured.

In addition, the steel sheet thickness (mm) and the presence or absence of laser axis control for each of the steel sheet Nos. 1 to 8 are also shown in Table 1.

TABLE 1

| Steel sheet | Steel sheet thickness | Chemical composition of product sheet (mass %) | | | | | | | | Laser magnetic domain | B8 | W17/50 |
|---|---|---|---|---|---|---|---|---|---|---|---|---|
| No. | (mm) | C | Si | Mn | P | S | Al | N | Cu | control | (T) | (W/kg) |
| (1) | 0.23 | 0.001 | 3.34 | 0.1 | 0.01 | <0.002 | <0.004 | <0.002 | 0.2 | Done | 1.92 | 0.72 |
| (2) | 0.20 | 0.001 | 3.34 | 0.1 | 0.01 | <0.002 | <0.004 | <0.002 | 0.2 | Done | 1.92 | 0.67 |
| (3) | 0.18 | 0.001 | 3.34 | 0.1 | 0.01 | <0.002 | <0.004 | <0.002 | 0.2 | Done | 1.92 | 0.63 |
| (4) | 0.15 | 0.001 | 3.34 | 0.1 | 0.01 | <0.002 | <0.004 | <0.002 | 0.2 | Done | 1.91 | 0.58 |
| (5) | 0.27 | 0.001 | 3.34 | 0.1 | 0.01 | <0.002 | <0.004 | <0.002 | 0.2 | Done | 1.93 | 0.83 |
| (6) | 0.30 | 0.001 | 3.34 | 0.1 | 0.01 | <0.002 | <0.004 | <0.002 | 0.2 | Done | 1.93 | 0.90 |

TABLE 1-continued

| Steel sheet No. | Steel sheet thickness (mm) | Chemical composition of product sheet (mass %) C | Si | Mn | P | S | Al | N | Cu | Laser magnetic domain control | B8 (T) | W17/50 (W/kg) |
|---|---|---|---|---|---|---|---|---|---|---|---|---|
| (7) | 0.35 | 0.001 | 3.34 | 0.1 | 0.01 | <0.002 | <0.004 | <0.002 | 0.2 | Done | 1.93 | 1.02 |
| (8) | 0.23 | 0.001 | 3.34 | 0.1 | 0.01 | <0.002 | <0.004 | <0.002 | 0.2 | None | 1.93 | 0.83 |

Figure 9:
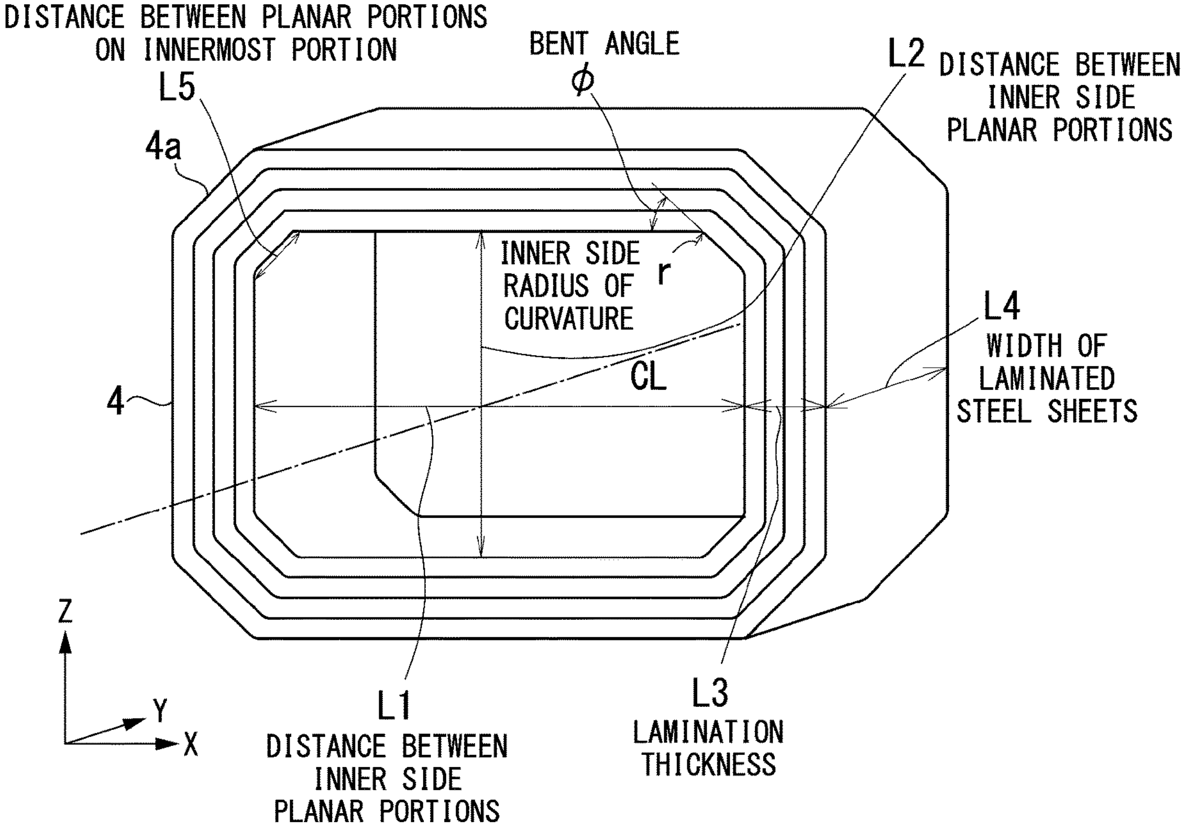
FIG. 9 is a schematic diagram showing dimensions of a wound core produced during evaluation of properties.

In addition, the present inventors produced core Nos. a to c having shapes shown in Table 2 and FIG. 9 using each of the steel sheet Nos. 1 to 8 as materials. Here, L1 is parallel to the X-axis direction and is the distance between parallel grain-oriented electrical steel sheets 1 on the innermost periphery of a wound core in a flat cross section including the center CL (distance between inner side planar portions). L2 is parallel to the Z-axis direction and is the distance between parallel grain-oriented electrical steel sheets 1 on the innermost periphery of a wound core in a vertical cross section including the center CL (distance between inner side planar portions). L3 is parallel to the X-axis direction and is the lamination thickness (thickness in the laminating direction) of a wound core in a flat cross section including the center CL. L4 is parallel to the X-axis direction and is a width of laminated steel sheets of a wound core in a flat cross section including the center CL. L5 is the distance between planar portions (distance between bent portions) which are adjacent to each other in the innermost portion of a wound core and arranged to form a right angle together. In other words, L5 is the shortest length of the planar portion 4*a* in the longitudinal direction between the planar portions 4, 4*a* of a grain-oriented electrical steel sheet on the innermost periphery. r is the radius of curvature of a bent portion 5 on the inner side of a wound core, and φ is a bent angle θ(°) of the above bent portion 5 of the wound core. The substantially rectangular core Nos. a to c in Table 2 in which the planar portions having an inner side planar portion distance L1 are divided at approximately the center of the distance L1 have a structure in which two cores having a "substantially U-shape" are joined.

Here, the core with core No. c is a wound core in the form of a so-called Tranco Core which is conventionally used as a general wound core and produced through a method in which steel sheets are wound into a cylindrical shape, corner portions of the cylindrical laminated body are subsequently pressed so as to have a constant curvature, and the cylindrical laminated body is formed into a substantially rectangular shape. For this reason, the radius of curvature r of the bent portion 5 varies greatly depending on the lamination position of the steel sheets. On the other hand, the core with core No. a is a wound core in the form of UNICORE having two bent portions 5 in one corner portion 3, and the core with core No. b is a wound core in the form of UNICORE having three bent portions 5 in one corner portion 3. In addition, the radius of curvature r in Table 2 is shown in detail in Table 3.

TABLE 2

| Core No. | Core shape L1 mm | L2 mm | L3 mm | L4 mm | L5 mm | r mm | φ ° | Bent sites Corner portion | Entire core |
|---|---|---|---|---|---|---|---|---|---|
| a | 197 | 66 | 45 | 150 | 16 | Refer | 45 | 2 | 8 |
| b | 197 | 66 | 45 | 150 | 18 | to | 30 | 3 | 12 |
| c | 197 | 66 | 55 | 150 | — | Table 3 | 90 | 1 | 4 |

As shown in Table 3, the present inventors applied a one-side free bending method as a bending method to 38 test samples of the core Nos. a to c produced using each of the steel sheet Nos. 1 to 8 as a material, obtained no-load loss for the cores using each steel sheet as a material by variously changing the thickness T of each grain-oriented electrical steel sheet 1, the bent angle φ(°) of a bent portion 5 of each wound core, the radius of curvature Rd (mm) of an arc portion 30*a* of each die 30 and the radius of curvature Rp (mm) of an arc portion 40*a* of each punch 40 (accordingly, Rp/Rd), the clearance C (mm), and the punch speed, and obtained a building factor (BF) by calculating the ratio of the no-load loss to the magnetic properties of the material steel sheets shown in Table 1. In the shapes of the cores in Table 3, O indicates a favorable shape which can be wound and enables BF measurement, Δ indicates a shape which can be wound and enables BF measurement, but is slightly poor, and X indicates a poor shape which cannot be wound and does not enable BF measurement. In addition, in the surfaces of the cores in Table 3, O indicates a favorable surface with few scratches, Δ indicates a surface which has scratches and powder formation but can be wound and enables BF measurement, and X indicates a poor surface which has scratches and peeling-off of coatings and does not enable BF measurement due to a short circuit.

As can be seen from the examples which satisfy the above dimensional requirements, that is, the relationships $0.02 \leq T/(2Rd+T) \leq 0.15$ (Equation (1)), $0.5 \leq Rd \leq 3.0$ (Equation (2)), $0.15 \leq T \leq 0.30$ (Equation (3)), $2.5 \leq Rp/Rd \leq 10$ (Equation (4)), and $10° \leq \theta \leq 90°$ (Equation (5)) and the comparative examples which do not satisfy the relationships, the building factors (BF) are minimized to 1.12 or less in the examples (iron loss of the wound cores is minimized). This means that the effective volume ratio and the iron loss of the wound cores are improved and the quality thereof is improved.

TABLE 3

| Test No. | Steel sheet | Sheet thickness T (mm) | Bending: Die rd (mm) | Bending: Die rp (mm) | Bending: Die rp/rd | Bending: Die C (mm) | Bending: Bent angle (°) | Bending: Radius of curvature (mm) | Bending: Target core | Punch speed (mm/min) | Core: Shape | Core: Surface | Core properties BF | Remarks |
|---|---|---|---|---|---|---|---|---|---|---|---|---|---|---|
| 1 | (1) | 0.23 | 1.0 | 5.0 | 5.0 | 0.28 | 45 | 1.1 | a | 300 | ○ | ○ | 1.09 | Example |
| 2 | (1) | 0.23 | 0.5 | 8.0 | 16.0 | 0.28 | 45 | 0.7 | a | 300 | X | ○ | — | Comparative Example |
| 3 | (1) | 0.23 | 0.2 | 5.0 | 25.0 | 0.28 | 45 | 0.3 | a | 300 | X | ○ | — | Comparative Example |
| 4 | (1) | 0.23 | 1.5 | 7.5 | 5.0 | 0.28 | 45 | 1.7 | a | 300 | ○ | ○ | 1.09 | Example |
| 5 | (1) | 0.23 | 2.0 | 7.5 | 3.8 | 0.28 | 45 | 2.2 | a | 300 | ○ | ○ | 1.09 | Example |
| 6 | (1) | 0.23 | 3.0 | 7.5 | 2.5 | 0.28 | 45 | 3.3 | a | 300 | ○ | ○ | 1.08 | Example |
| 7 | (1) | 0.23 | 4.0 | 7.5 | 1.9 | 0.28 | 45 | 5.2 | a | 300 | X | ○ | — | Comparative Example |
| 8 | (1) | 0.23 | 1.0 | 7.5 | 7.5 | 0.28 | 45 | 1.1 | a | 300 | ○ | ○ | 1.08 | Example |
| 9 | (1) | 0.23 | 1.0 | 10.0 | 10.0 | 0.28 | 45 | 1.1 | a | 300 | ○ | X | 1.08 | Example |
| 10 | (1) | 0.23 | 1.0 | 12.0 | 12.0 | 0.28 | 45 | 1.3 | a | 300 | X | ○ | — | Comparative Example |
| 11 | (1) | 0.23 | 1.0 | 4.0 | 4.0 | 0.28 | 45 | 1.1 | a | 300 | ○ | ○ | 1.10 | Example |
| 12 | (1) | 0.23 | 1.0 | 2.0 | 2.0 | 0.28 | 45 | 1.1 | a | 300 | ○ | X | — | Comparative Example |
| 13 | (2) | 0.2 | 0.5 | 5.0 | 10.0 | 0.25 | 45 | 0.7 | a | 300 | X | ○ | 1.09 | Comparative Example |
| 14 | (3) | 0.18 | 0.5 | 5.0 | 10.0 | 0.23 | 45 | 0.6 | a | 300 | ○ | ○ | 1.09 | Example |
| 15 | (6) | 0.3 | 10.0 | 25.0 | 2.5 | 0.37 | 45 | 15.0 | a | 300 | X | ○ | — | Comparative Example |
| 16 | (7) | 0.35 | 10.0 | 15.0 | 1.5 | 0.44 | 45 | 15.0 | a | 300 | ○ | X | — | Comparative Example |
| 17 | (8) | 0.23 | 1.0 | 5.0 | 5.0 | 0.28 | 45 | 1.1 | a | 300 | ○ | ○ | 1.06 | Example |
| 18 | (1) | 0.23 | 1.0 | 5.0 | 5.0 | 0.28 | 30 | 1.1 | b | 300 | ○ | ○ | 1.12 | Example |
| 19 | (1) | 0.23 | 1.0 | 5.0 | 5.0 | 0.28 | 90 | 1.1 | c | 300 | ○ | ○ | 1.09 | Example |
| 20 | (1) | 0.23 | 1.0 | 5.0 | 5.0 | 0.28 | 45 | 1.2 | a | 30 | Δ | ○ | 1.09 | Example |
| 21 | (1) | 0.23 | 1.0 | 5.0 | 5.0 | 0.28 | 45 | 1.1 | a | 100 | ○ | ○ | 1.09 | Example |
| 22 | (1) | 0.23 | 1.0 | 5.0 | 5.0 | 0.28 | 45 | 1.1 | a | 1000 | ○ | ○ | 1.09 | Example |
| 23 | (1) | 0.23 | 1.0 | 5.0 | 5.0 | 0.28 | 45 | 1.1 | a | 2000 | ○ | ○ | 1.09 | Example |
| 24 | (1) | 0.23 | 1.0 | 5.0 | 5.0 | 0.28 | 45 | 1.1 | a | 3000 | ○ | ○ | 1.09 | Example |
| 25 | (1) | 0.23 | 1.0 | 5.0 | 5.0 | 0.28 | 45 | 1.1 | a | 5000 | ○ | Δ | 1.09 | Example |
| 26 | (1) | 0.23 | 1.0 | 5.0 | 5.0 | 0.1 | 45 | 1.1 | a | 300 | ○ | Δ | 1.09 | Example |
| 27 | (1) | 0.23 | 1.0 | 5.0 | 5.0 | 0.12 | 45 | 1.1 | a | 300 | ○ | ○ | 1.09 | Example |
| 28 | (1) | 0.23 | 1.0 | 5.0 | 5.0 | 0.17 | 45 | 1.1 | a | 300 | ○ | ○ | 1.09 | Example |
| 29 | (1) | 0.23 | 1.0 | 5.0 | 5.0 | 0.23 | 45 | 1.1 | a | 300 | ○ | ○ | 1.09 | Example |
| 30 | (1) | 0.23 | 1.0 | 5.0 | 5.0 | 0.34 | 45 | 1.1 | a | 300 | ○ | ○ | 1.09 | Example |
| 31 | (1) | 0.23 | 1.0 | 5.0 | 5.0 | 0.38 | 45 | 1.2 | a | 300 | Δ | ○ | 1.09 | Example |
| 32 | (2) | 0.2 | 0.8 | 5.0 | 6.3 | 0.25 | 45 | 0.9 | a | 300 | ○ | ○ | 1.09 | Example |
| 33 | (3) | 0.18 | 0.8 | 5.0 | 6.3 | 0.23 | 45 | 0.9 | a | 300 | ○ | ○ | 1.09 | Example |
| 34 | (3) | 0.18 | 0.5 | 5.0 | 6.3 | 0.23 | 45 | 0.6 | a | 300 | ○ | ○ | 1.11 | Example |
| 35 | (4) | 0.15 | 0.8 | 5.0 | 6.3 | 0.18 | 45 | 0.9 | a | 300 | ○ | ○ | 1.09 | Example |
| 36 | (4) | 0.15 | 0.5 | 5.0 | 6.3 | 0.18 | 45 | 0.6 | a | 300 | ○ | ○ | 1.12 | Example |
| 37 | (5) | 0.27 | 1.2 | 6.0 | 5.0 | 0.33 | 45 | 1.3 | a | 300 | ○ | ○ | 1.09 | Example |
| 38 | (6) | 0.3 | 1.2 | 6.0 | 5.0 | 0.37 | 45 | 1.3 | a | 300 | ○ | ○ | 1.09 | Example |

INDUSTRIAL APPLICABILITY

According to the present invention, it is possible to provide a method and a device for producing a wound core which can minimize cracking in bent portions of grain-oriented electrical steel sheets during bending of the steel sheets, prevent scratches on the surface of the steel sheets or peeling-off or powdering of a coating on the surface, and improve the shape fixability.

BRIEF DESCRIPTION OF THE REFERENCE SYMBOLS

1 Grain-oriented electrical steel sheet
4 Planar portion
5 Bent portion
10 Wound core (wound core main body)
30 Die
**30*a*** Arc portion
40 Punch
**40*a*** Arc portion
71 Bending unit
72 Assembly unit

The invention claimed is:

1. A method of producing a wound core that is a wound core having a wound shape including a rectangular hollow portion in the center and a portion in which grain-oriented electrical steel sheets in which planar portions and bent portions are alternately continuous in a longitudinal direction are stacked in a sheet thickness direction, which is a wound core formed by stacking the grain-oriented electrical steel sheets that have been individually bent in layers and assembled into a wound shape and in which the plurality of grain-oriented electrical steel sheets are connected to each other via at least one joining part for each roll, the method comprising:

forming at least one of the bent portions of one or more of the laminated grain-oriented electrical steel sheets such that one side of the grain-oriented electrical steel sheet is placed and constrained on a die and a punch is press formed against a portion of the grain-oriented electrical steel sheet to be bent on the other free end side in the thickness direction of the grain-oriented electrical steel sheet, wherein outer surfaces of the die and the punch each have an arc portion having a predetermined curvature on a cross section along the thickness direction of the grain-oriented electrical steel sheet, wherein, when the thickness of the grain-oriented electrical steel sheet is T (mm), bent angles of the bent portions are θ(°), a radius of curvature of the arc portion of the die is Rd (mm), and a radius of curvature of the arc portion of the punch is Rp (mm), relationships of Equations (1) to (5) below are satisfied, and wherein the portion of the grain-oriented electrical steel sheet to be bent is pressurized by the arc portion of the punch and bent along the arc portion of the die so that four or more of the bent portions are formed in one of the grain-oriented electrical steel sheets, $$0.02 \le T/(2Rd + T) \le 0.15 \quad (1)$$

$$0.5 \le Rd \le 3.0 \quad (2)$$

$$0.15 \le T \le 0.30 \quad (3)$$

$$2.5 \le Rp/Rd \le 10 \quad (4)$$

$$10° \le \theta \le 90°. \quad (5)$$

2. The method of producing a wound core according to claim 1, wherein the bent portions are formed by bending the portions of the grain-oriented electrical steel sheets to be bent at a punch speed of 30 mm/min to 3,000 mm/min.

3. The method of producing a wound core according to claim 2, wherein a predetermined clearance C (mm) is provided within a range of 0.5 T≤C≤1.5 T between the die and the punch on the cross section along the thickness direction of the grain-oriented electrical steel sheets in a direction orthogonal to a press forming direction of the punch.

4. The method of producing a wound core according to claim 1, wherein a predetermined clearance C (mm) is provided within a range of 0.5 T≤C≤1.5 T between the die and the punch on the cross section along the thickness direction of the grain-oriented electrical steel sheets in a direction orthogonal to a press forming direction of the punch.

5. A device for producing a wound core, comprising:

a bending unit that individually bends grain-oriented electrical steel sheets; and an assembly unit that stacks the bent grain-oriented electrical steel sheets in layers and assembles them into a wound shape to form a wound-shaped wound core including a portion in which grain-oriented electrical steel sheets in which planar portions and bent portions are alternately continuous in a longitudinal direction are stacked in a sheet thickness direction, wherein the bending unit has a die and a punch, and in the bending unit, an arc portion having a predetermined curvature on a cross section along the thickness direction of the grain-oriented electrical steel sheets is formed on outer surfaces of the die and the punch, and at least one of the bent portions of one or more of the laminated grain-oriented electrical steel sheets is formed such that one side of the grain-oriented electrical steel sheet is placed and constrained on the die and a portion of the grain-oriented electrical steel sheet to be bent on the other free end side is pressurized by the arc portion of the punch in the thickness direction of the grain-oriented electrical steel sheet and bent along the arc portion of the die, and wherein, when the thickness of the grain-oriented electrical steel sheet is T (mm), bent angles of the bent portions are θ(°), a radius of curvature of the arc portion of the die is Rd (mm), and a radius of curvature of the arc portion of the punch is Rp (mm), relationships of Equations (1) to (5) below are satisfied, $$0.02 \le T/(2Rd + T) \le 0.15 \quad (1)$$

$$0.5 \le Rd \le 3.0 \quad (2)$$

$$0.15 \le T \le 0.30 \quad (3)$$

$$2.5 \le Rp/Rd \le 10 \quad (4)$$

$$10° \le \theta \le 90°. \quad (5)$$

6. The device for producing a wound core according to claim 5, wherein the bending unit forms the bent portions by bending the portions of the grain-oriented electrical steel sheet to be bent at a punch speed of 30 mm/min to 3,000 mm/min.

7. The device for producing a wound core according to claim 6, wherein a predetermined clearance C (mm) is provided within a range of 0.5 T≤C≤1.5 T between the die and the punch on the cross section along the thickness direction of the grain-oriented electrical steel sheet in a direction orthogonal to a press forming direction of the punch.

8. The device for producing a wound core according to claim 5, wherein a predetermined clearance C (mm) is provided within a range of 0.5 T≤C≤1.5 T between the die and the punch on the cross section along the thickness direction of the grain-oriented electrical steel sheet in a direction orthogonal to a press forming direction of the punch.

* * * * *